(12) United States Patent
Liu et al.

(10) Patent No.: US 8,874,587 B2
(45) Date of Patent: Oct. 28, 2014

(54) TENANT PLACEMENT IN MULTITENANT CLOUD DATABASES WITH ONE-TO-MANY DATA SHARING

(71) Applicant: NEC Laboratories America, Inc., Princeton, NJ (US)

(72) Inventors: Ziyang Liu, Santa Clara, CA (US); Vahit Hakan Hacigumus, San Jose, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 124 days.

(21) Appl. No.: 13/684,405

(22) Filed: Nov. 23, 2012

(65) Prior Publication Data
US 2013/0132404 A1    May 23, 2013

Related U.S. Application Data

(60) Provisional application No. 61/563,154, filed on Nov. 23, 2011.

(51) Int. Cl.
*G06F 17/30* (2006.01)
(52) U.S. Cl.
CPC ................................ *G06F 17/30575* (2013.01)
USPC ........................................................ 707/748
(58) Field of Classification Search
CPC . G06F 21/6218; G06F 17/30; G06F 11/3006; G06F 17/30289; G06F 17/30575
USPC ......... 709/226, 206, 223, 203, 204, 224, 213, 709/217, 220, 225; 707/722, 609, 783, 687, 707/736, 737, 740, 756, E17.005, E17.014, 707/E17.032, E17.066, E17.108, 603, 608, 707/610, 689, 694, 695, 698, 702, 705, 711, 707/715, 718, 749, 758, 765, 767, 780, 781, 707/784, 785, 803, 827; 705/307, 14.71, 705/14.73, 2, 26.3, 27.2, 305, 317, 35, 5, 705/7.27, 7.36, 7.39; 715/234, 748, 752, 715/765, 810; 711/E12.016, 114, 158, 162
See application file for complete search history.

(56) References Cited

U.S. PATENT DOCUMENTS

| | | | |
|---|---|---|---|
| 2010/0005055 A1* | 1/2010 | An et al. | 707/2 |
| 2012/0173513 A1* | 7/2012 | Agrawal et al. | 707/716 |
| 2012/0331016 A1* | 12/2012 | Janson et al. | 707/809 |

OTHER PUBLICATIONS

Amossen, R. "Vertical Partitioning of Relational OLTP Databases Using Integer Programming" Workshops Proceedings of the 26th International Conference on Data Engineering, ICDE 2010. Mar. 2010. pp. 93-98.

(Continued)

*Primary Examiner* — Jay Morrison
*Assistant Examiner* — Ken Hoang
(74) *Attorney, Agent, or Firm* — Joseph Kolodka

(57) ABSTRACT

Methods for generating a data fetching plan in a multi-tenant system include placing tenants in consecutively allocated databases according to a weighted graph of tenants and sharing relationships between tenants, where at least one sharing relationship includes multiple accessing tenants accessing a given set of data from a provider tenant. For each sharing relationship, if a current database has one or more accessing tenants and does not have the provider tenant, data is fetched from the latest-allocated database prior to the current database that has accessing tenants, if such a database exists; if a current database has the provider tenant, data is provided to the earliest-allocated database after the current database that has accessing tenants if such a database exists. The fetching and providing steps are repeated for each allocated database.

10 Claims, 4 Drawing Sheets

(56) References Cited

OTHER PUBLICATIONS

Aulbach, S., et al. "Multi-Tenant Databases for Software as a Service: Schema-Mapping Techniques" Proceedings of the ACM SIGMOD International Conference on Management of Data (SIGMOD'08). Jun. 2008. pp. 1195-1206.

Azeez, A., et al. "Multi-Tenant Soa Middleware for Cloud Computing" 2010 IEEE 3rd International Conference on Cloud Computing. Jul. 2010. pp 458-465.

Balazinska, M., et al. "Data Markets in the Cloud: An Opportunity for the Database Community" Proceedings of the VLDB Endowment, vol. 4, No. 12. Aug. 2011. (4 pages).

Chi, Y., et al. "ICBS: Incremental Cost-Based Scheduling Under Piecewise Linear SLAS" Proceedings of the VLDB Endowment, vol. 4, No. 9. Aug. 2011. pp. 563-574.

Chi, Y., et al. "SLA-Tree: A Framework for Efficiency Supporting SLA-Based Decisions in Cloud Computing" 14th International Conference on Extending Database Technology (EDBT 2011). Mar. 2011. pp. 129-140.

Das, S., et al. "Albatross: Lightweight Elasticity in Shared Storage Databases for the Cloud Using Live Data Migration" Proceedings of the VLDB Endowment, vol. 4, No. 8. Aug. 2011. pp. 494-505.

Elmore, A., et al. "Zephyr: Live Migration in Shared Nothing Databases for Elastic Cloud Platforms" Proceedings of the ACM SIGMOD International Conference on Management of Data (SIGMOD '11). Jun. 2011. (12 pages).

Epstein, L., et al. "AFPTAS Results for Common Variants of Bin Packing: A New Method to Handle the Small Items" SIAM Journal on Optimization, vol. 20. Jun. 2009. pp. 1-20.

Epstein, L., et al. "On Bin Packing With Conflicts" SIAM Journal on Optimization, vol. 19, No. 3. Nov. 2008. (25 pages).

Fehling, C., et al. "A Framework for Optimized Distribution of Tenants in Cloud Applications" 2010 IEEE 3rd International Conference on Cloud Computing. Jul. 2010. pp. 252-259.

Garey, M., et al. "Some Simplified Np-Complete Problems" Proceedings of the 6th Annual ACM Symposium on Theory of Computing. Apr. 1974. pp. 47-63.

Guo, C., et al. "A Framework for Native Multi-Tenancy Application Development and Management" 9th IEEE International Conference on E-Commerce Technology and the 4th International Conference on Enterprise Computing, E-Commerce and E-Services (CEC-EEE 2007). Jul. 2007. (8 Pages).

Jacobs, D., et al. "Ruminations on Multi-Tenant Databases" Datenbanksysteme in Business, Technologie und Web (BTW 2007). Mar. 2007. (8 pages).

Sankaranarayanan, J., et al. "COSMOS: A Platform for Seamless Mobile Services in the Cloud" 2011 12th IEEE International Conference on Mobile Data Management. Jun. 2011. pp. 303-312.

Xiong, P., et al. "ACTIVESLA: A Profit-Oriented Admission Control Framework for Database-As-A-Service Providers" Proceedings of ACM Symposium on Cloud Computing (SOCC '11). Oct. 2011. (14 pages).

Yang, F., et al. "A Scalable Data Platform for a Large Number of Small Applications" 4th Biennial Conference on Innovative Data Systems Research (CIDR). Jan. 2009. (10 pages).

Zhang, Y., et al. "An Effective Heuristic for On-Line Tenant Placement Problem in SAAS" 2010 IEEE International Conference on Web Services. Jul. 2010. pp. 425-432.

Zhao, G., et al. "Trusted Data Sharing Over Untrusted Cloud Storage Providers" 2nd IEEE International Conference on Cloud Computing Technology and Science. Nov. 2010. pp. 97-103.

\* cited by examiner

TENANT PLACEMENT IN MULTITENANT CLOUD DATABASES WITH ONE-TO-MANY DATA SHARING

RELATED APPLICATION INFORMATION

This application claims priority to provisional application Ser. No. 61/563,154 filed on Nov. 23, 2011, incorporated herein by reference.

The present application is related to U.S. application Ser. No. 13/684,399, entitled "Tenant Placement in Multitenant Cloud Databases with Data Sharing," filed Nov. 23, 2012 and incorporated herein by reference.

BACKGROUND

1. Technical Field

The present invention relates to multitenant databases and, more particularly to tenant placement within multitenant databases when the tenants share data.

2. Description of the Related Art

In a cloud environment, to achieve economies of scale and elasticity, multiple tenants may be placed in the same computing node/machine. Given a set of tenants, such that each tenant consumes a certain amount of resource, the cloud service provider would like to use as few machines as possible to accommodate these tenants. When different tenants have no interactions, this can be considered as the Bin Packing problem.

However, as the cloud provides opportunities for the tenants to share data, it is likely the case that tenants would have interactions with one another. If one tenant shares its data with another tenant, it may be beneficial to place these two tenants on the same machine as, at the very least, it can save the cost of transferring the data between different machines. While the bin packing problem for multitenant databases without data sharing is relatively easy to solve, introducing data sharing causes the problem to become very difficult, not only to solve outright but even to approximate.

SUMMARY

A method for tenant placement in a multi-tenant system is shown that includes creating a weighted graph of tenants and sharing relationships between tenants, where a weight for each tenant and each sharing relationship represents an associated degree of resource consumption; and adding one or more tenants to a database using a processor based on said weighted graph and a database capacity, such that the combined weight of the added tenants and the sharing relationships belonging to said added tenants are within the database capacity. If a tenant cannot be added to the database without exceeding the database capacity, a new database is created and the one or more tenants are added to the new database, subject to a new database capacity. The adding and creating steps are repeated until all tenants have been added to a database.

A method for tenant placement in a multi-tenant system is shown that includes creating a weighted graph of tenants and sharing relationships between tenants, where a weight for each tenant and each sharing relationship represents an associated degree of resource consumption; and adding one or more tenants to a database using a processor based on said weighted graph and a database capacity, such that the combined weight of the added tenants and the sharing relationships belonging to said added tenants are within the database capacity, the weight of a sharing relationship between two tenants is zero when tenants are on the same database, and the weight of a sharing relationship is non-zero when the two tenants are on different databases, wherein each tenant is assigned to one and only one database. If a tenant cannot be added to the database without exceeding the database capacity, a new database is created and the one or more tenants are added to the new database, subject to a new database capacity. The steps of adding and creating are repeated until all tenants have been added to a database.

A method for generating a data fetching plan in a multi-tenant system includes placing tenants in consecutively allocated databases using a processor according to a weighted graph of tenants and sharing relationships between tenants, where at least one sharing relationship includes multiple accessing tenants accessing a given set of data from a provider tenant. For each sharing relationship, if a current database has one or more accessing tenants and does not have the provider tenant, the method includes fetching data from the latest-allocated database prior to the current database that has accessing tenants, if such a database exists; if a current database has the provider tenant, providing data to the earliest-allocated database after the current database that has accessing tenants if such a database exists. Said fetching and providing steps are repeated for each allocated database.

A method for generating a data fetching plan in a multi-tenant system is shown that includes placing tenants in consecutively allocated databases using a processor according to a weighted graph of tenants and sharing relationships between tenants, wherein the weighted graph of tenants and sharing relationships includes a weight for each tenant and for each sharing relationship that represents an associated degree of resource consumption and wherein at least one sharing relationship includes multiple accessing tenants accessing a given set of data from a provider tenant, where said placing includes adding one or more tenants to a database based on said weighted graph and a database capacity, such that the combined weight of the added tenants and the sharing relationships belonging to said added tenants are within the database capacity; and allocating tenants to a new database when a previous database lacks available resources for new tenants. For each such sharing relationship: if a current database has one or more accessing tenants and does not have the provider tenant, the method includes fetching data from the latest-allocated database prior to the current database that has accessing tenants, if such a database exists; if a current database has the provider tenant, the method includes providing data to the earliest-allocated database after the current database that has accessing tenants if such a database exists. Said fetching and providing steps are repeated for each allocated database.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles formalize the problem of tenant placement with data sharing as a variation of Bin Packing named Bin Packing with Sharing (BPS). Unlike Bin Packing and some of its other variations, which are fairly easy to approximate, BPS is one of the most difficult problems to approximate. The problem of determining the feasibility of a BPS instance is strongly NP-complete. As a result, the present principles restrict the focus to those BPS instances where there is always a trivial feasible solution. Since it is not possible to approximate BPS unless P=NP, an alternative performance criterion for BPS is considered named Tightly Consolidated Packing (TCP). The present principles provide a method that satisfies TCP. Furthermore, the present principles may achieve TCP for online BPS as well.

Figure 1:
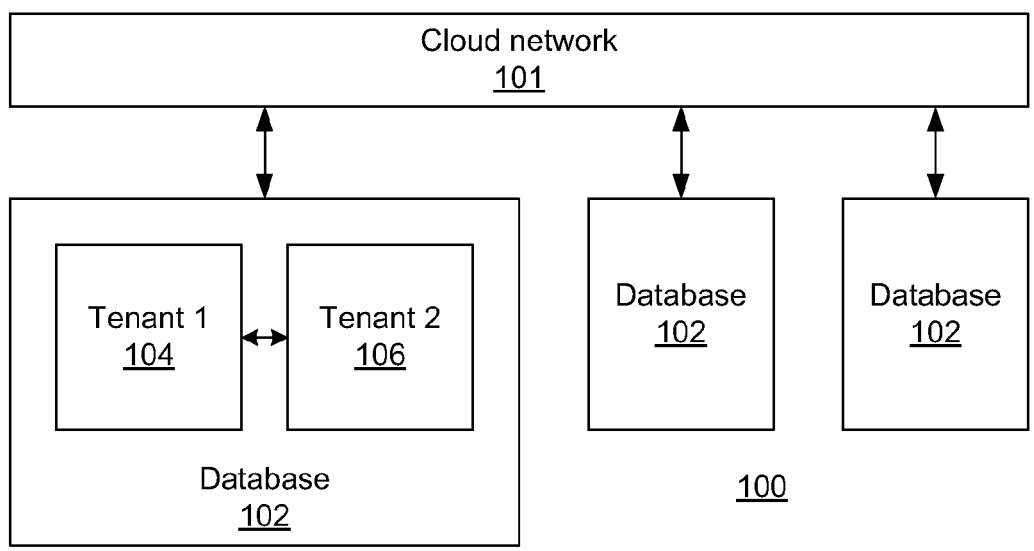
FIG. 1 is a diagram of a multi-tenant cloud database system according to the present principles.

Referring now to FIG. 1, an exemplary multitenant database system 100 is shown. The system 100 includes a set of multitenant databases 102 connected to one another through a cloud network 101. Each multitenant database 102 may include one or more tenants 104. The tenants 104 may operate separately or may share data.

A major expense of the multitenant database service providers is to purchase or rent a system 100 from an Infrastructure-as-a-Service (IaaS) provider. Hence, it is desirable to minimize the number of machines 102 used to host those tenants 104. As computing resources, such as CPU, memory and I/O, are generally considered to be additive (i.e., the total consumption of a set of tenants equals the sum of their individual consumption without the other tenants), this could be considered as the multi-capacity Bin Packing problem where each item represents a tenant 104 and a bin represents a machine 102.

Multitenant cloud databases 102 not only provide the opportunity for tenants 104 to share the infrastructure resources, databases or tables, but also enable tenants 104 to share data with one another. For cloud service provider 100, this means more utilization of the cloud resources and hence more revenue; for the data owner, data sharing means turning its data into profits; for the consumer, it means purchasing data for a reasonable price, which can then be used in its own applications to achieve various purposes and enhance user experiences. For example, if a hotel booking application gets the data of users' travel schedules from other applications such as an airline booking application or a calendar application, then it can automatically recommend the most relevant hotels to the user. In this way, different applications can work seamlessly to deliver an excellent user experience.

If data is shared among different tenants 104, then the Bin Packing problem becomes much harder. If tenant $t_1$ shares data with $t_2$, then it is beneficial to place $t_1$ and $t_2$ on the same machine, so that they can access the same copy of the shared data. On the other hand, if $t_1$ and $t_2$ are on different machines, it incurs a cost of propagating the shared data from $t_1$ to $t_2$, which costs additional resources on both machines 102, as it involves additional procedures such as checking the staleness of the data, determining when to propagate the update of the data to the destination machine 102, updating the data on the destination machine 102, updating the indexes, recovering from network failures, etc.

In the embodiments described herein, it is assumed that each machine 102 has a fixed capacity and that each tenant 104 consumes a certain amount of resources to query its own data. Furthermore, it is assumed that, if $t_1$ and $t_2$ share data, there will be no additional cost; otherwise it accessing another tenant's data will cost a certain amount of resources. These assumptions are set forth for the purpose of illustration and ease of description—they should not be considered to be limiting.

Unlike the classic Bin Packing problem, which can be readily approximated, BPS is very difficult to approximate. Due to its inapproximability, the present principles provide a non-trivial local optimum criterion: in the solution of BPS, the present principles do not consolidate all of the tenants 104 on any subset of machines 102 into a single machine 102. Although this property is trivial to achieve in classic Bin Packing, that is not the case for BPS. The present principles provide a polynomial time method for achieving that local optimum property.

Tenants 104 may come and go within the cloud system 100, where a tenant 104 may launch of suspend a sharing relationship with another tenant 104 at any time. After a change has occurred to a tenant 104 or a sharing relationship between tenants 104, it is still desirable to maintain the local optimum property of tenant placement. However, the present principles avoid two things: computing the tenant placement from scratch and moving too many tenants 104 from one machine 102 to another machine 102. Recomputing placement from scratch may be very expensive, as there can be hundreds or thousands of tenants 104 in a single cloud system 100. Similarly, moving too many tenants 104 between machines is costly, as it creates a throughput bottleneck.

The input of the BPS problem is a directed graph G(V,A). Each vertex u∈V corresponds to a tenant 102 and has a non-negative weight $w_v(u)$. Each arc e=(u,v)∈A has two non-negative weights, associated with u and v respectively, denoted as $w_A(e,u)$ and $w_A(e,v)$. Each bin corresponds to a database 102 and has a capacity of B. Placing vertex u in a bin b consumes $w_V(u)+\Sigma_{e\in A'}w_A(e,u)$ of the capacity of bin b, where A' is the set of arcs (u,v) and (v,u), where v is not placed in b. The goal is to place all vertices into the smallest number of bins. For conciseness, for an arc e=(u,v), let $x=w_A(e,u)$ and $y=w_A(e,v)$, the weights of e is denoted as (x,y).

Intuitively, $w_V(u)$ corresponds to the resources consumed individually by a tenant 104, u, when it is placed in a database 102, bin b. (x,y) corresponds to additional resources consumed to enable and maintain the data sharing related operations described above. For each vertex v adjacent to u (i.e., where u and v have a sharing relationship), if v is placed in the same bin as u, there is no additional cost. Otherwise, the corresponding arc weight $w_A(e,u)$ will be consumed out of b's capacity.

In practice, placing u and v in the same bin may incur a small additional cost, rather than no additional cost. However, since this cost (say $(c_u, c_v)$) is small compared to the cost of placing u and v in separate bins (i.e., $(w_A(e,u),w_A(e,v))$), one can remove this cost by considering it as part of u and v's vertex weights. In other words, one can add $c_u$ and $c_v$ to $w_V(u)$ and $w_V(v)$, and subtract them from $w_A(e,u)$ and $w_A(e,v)$, respectively.

The BPS problem is highly inapproximable. To address this problem, the present principles provide a performance criterion that provides locally optimal solutions. That criterion is described herein as Tightly Consolidated Packing (TCP), restricting the focus to those BPS instances where it is always possible to place each vertex in a distinct bin, a condition which is generally the case in real-world applications.

The TCP criterion is defined as solutions to a BPS instance, if and only if one cannot combine vertices in any set of multiple bins in the solution into a single bin. While the criterion seems straightforward, in the BPS problem, the interaction among vertices makes finding a solution significantly more difficult difficult.

Figure 2:
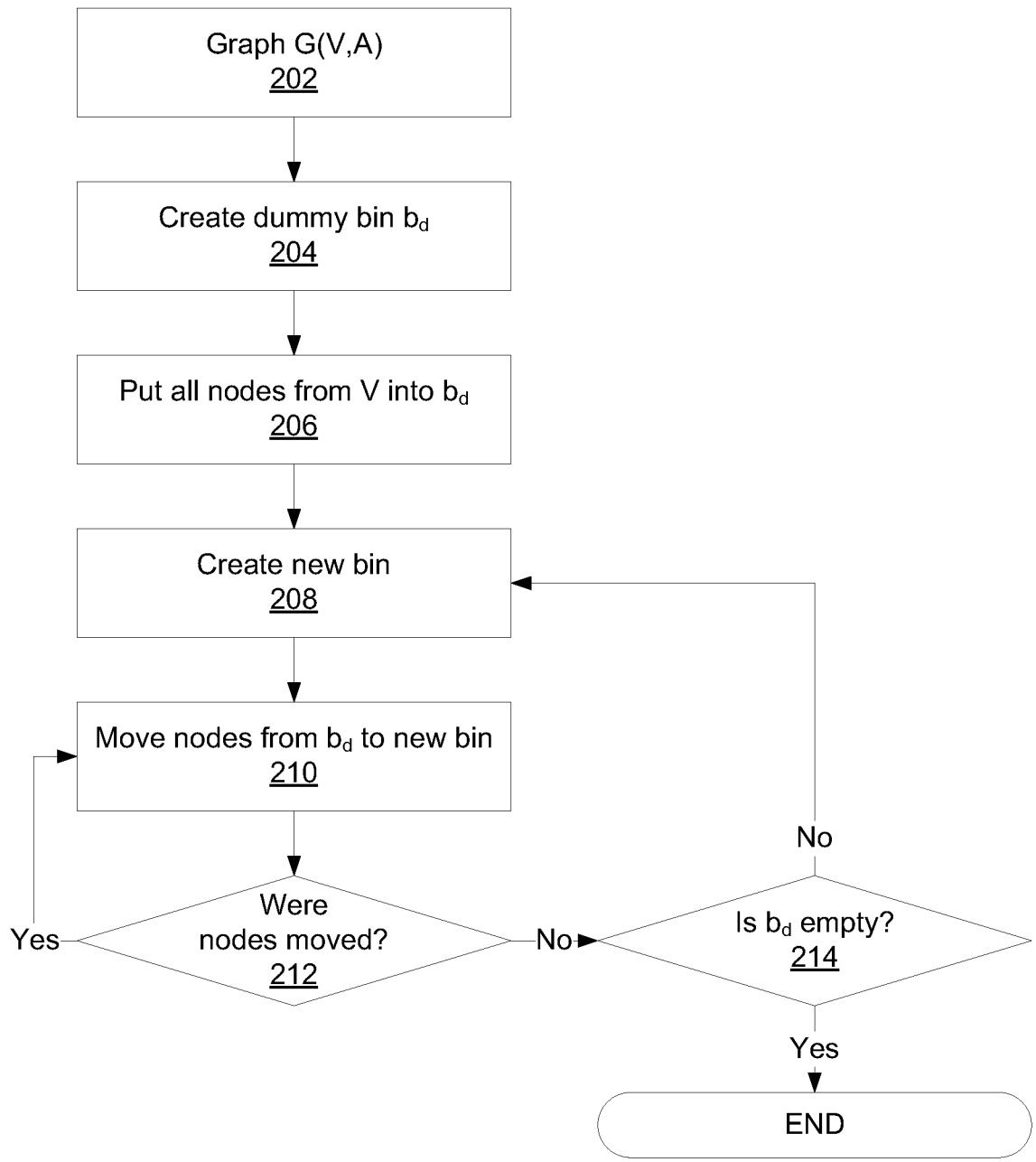
FIG. 2 is a block/flow diagram of tenant placement in a multi-tenant database system according to the present principles.

Referring now to FIG. 2, a method for achieving TCP in polynomial time is shown. Block 202 creates a graph of the tenants 104, including a list of vertices V that represent the tenants 104 and arcs A that represent sharing connections between the tenants. Block 204 creates a dummy bin $b_d$ to hold all of the vertices at block 206.

Block 208 creates a new, empty bin, representing a database 102 having a fixed capacity. Block 210 moves nodes from the dummy bin into the new bin. A move function employed by block 210 moves vertices while ensuring that the capacity of the new bin is not exceeded. If vertices were successfully moved, block 212 returns processing to block 210 to determine whether additional vertices may be moved into the new bin. If not, block 214 determines whether any unplaced vertices remain in the dummy bin. If not, processing returns to block 208 and a new bin is created. If so, processing ends with all tenants 104 having been assigned to databases 102.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
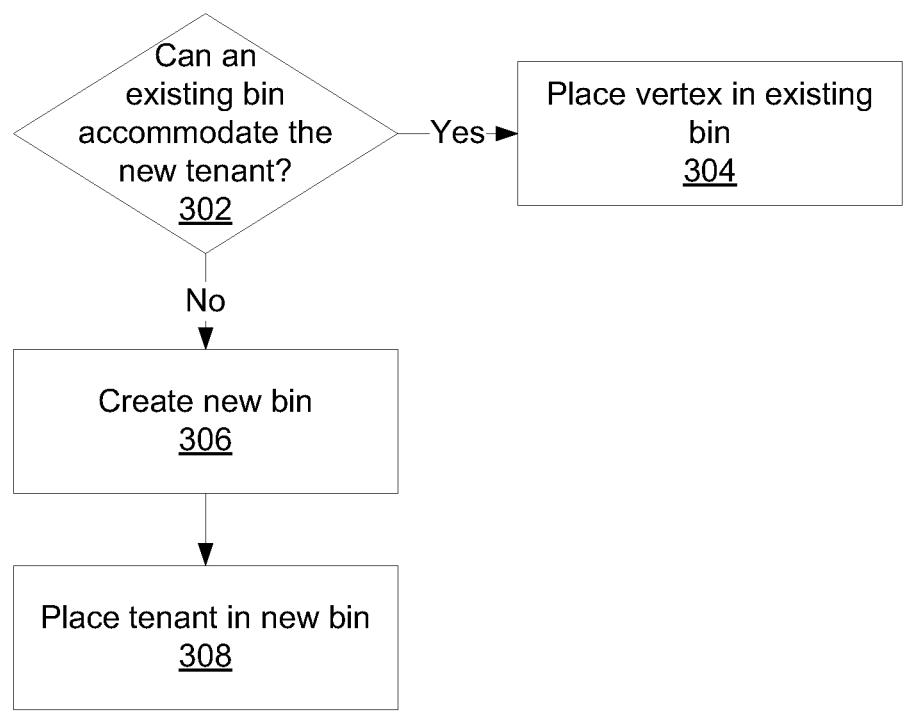
FIG. 3 is a block/flow diagram of online tenant placement in a multi-tenant database system according to the present principles.

Referring now to FIG. 3, online placement of a new tenant 104 is shown. After initial TCP placement, online placement can be implemented in such a way as to preserve TCP. If a new tenant/vertex 104 is added to cloud 100, it is first determined at block 302 whether any existing database/bin 102 can accommodate it. If so, the vertex is placed into an existing bin at block 304. If not, block 306 creates a new bin and block 308 places the tenant into the new bin. If the original bin packing plan is TCP, then this bin packing plan is also TCP, since adding a new vertex always reduces the remaining capacity of a bin.

If two vertices in different bins start a new sharing, then one or both of the bis may exceed their capacity. If a bin exceeds capacity, it may move some vertices to another bin or move vertices from another bin to itself. Because sharing between bins incurs an overhead, bringing additional vertices into the bin may actually reduce the overall capacity consumed.

The above method for placement can be adjusted to accommodate the removal of vertices and arcs. Due to the high overhead of moving tenants, the present principles determine whether some bins in the plan can be consolidated. Bins are either left unchanged or are emptied entirely, such that all vertices in each bin may be considered as a single logical vertex for the purpose of consolidation.

The above assumes that a sharing is a binary relationship: one tenant 104 shares some data to another tenant 104 in the cloud 100. If there are multiple tenants 104 that share data from a data owner, then they are modeled as multiple binary relationships. However, if multiple tenants 104 share the same data from a data owner, then there one can do more to optimize the tenant placement.

First, suppose a tenant $t_1$ shares the same data to two tenants $t_2$ and $t_3$. Then, if $t_2$ and $t_3$ cannot be placed on the same machine 102 as $t_1$, it is beneficial to put $t_2$ and $t_3$ on the same machine 102, rather than separate $t_2$ and $t_3$. In this way, one only transfers one copy of the data from $t_1$'s machine to $t_2$ and $t_3$'s machine, and $t_2$, $t_3$ can share this data on their machine. Second, if $t_1$ shares the same data to $t_2$ and $t_3$ and they are all placed on different machines, then $t_2$ and $t_3$ does not necessarily have to both fetch data from $t_1$'s machine. $t_2$ can fetch data from $t_1$'s machine, and $t_3$ can fetch data from $t_2$'s machine.

Based on these observations, the BPS problem may be extended to Bin Packing with one-to-Many Sharings (BPMS). The input of the BPMS problem is a set of vertices V, a set of sharings S among the vertices, and a bin capacity B. Each vertex u∈V is associated with a non-negative weight $w_V$(u). Each sharing s∈S is defined as s=(u,U) where u∈V, U ⊂ V and u∉U. Each sharing s is associated with two non-negative weights: $w_{in}$ (s) and $w_{out}$ (s).

A sharing plan has two parts: a placement plan which decides which vertex to place into which bin, and a data fetching plan, which decides which bin provides data to which bin(s) for each sharing. For each sharing s=(u,U), if a subset U'⊆ U of vertices are placed in the same bin b, and u∉b, then the data fetching plan specifies another bin from where b fetches the data of s. The data originates from u.

Placing a vertex u in bin b consumes $w_V$(u) capacity of b. Furthermore, if bin b fetches the data of sharing s from another bin b', then it consumes $w_{in}$ (s) capacity in b and consumes $w_{out}$(s) capacity in b'. The goal is to find a sharing plan that uses the smallest number of bins.

One cannot use the same TCP definition from the BPS problem is used for BPMS, because that TCP formulation does not say anything about the fetching plan. It is NP-hard to determine whether there is a fetching plan, which, together with the given placement plan, forms a valid sharing plan. Therefore, allowing arbitrary changes on the fetching plan makes it difficult to achieve TCP. The BPMS definition of TCP is therefore as follows. A solution to a BPMS instance is a TCP if and only if one cannot combine the vertices in any set of multiple bins $\mathcal{B}$ in the solution into a single bin b without changing the data fetching plan, except for the following cases: (1) if $b_1 \in \mathcal{B}$ provides data to $b_2 \in \mathcal{B}$, this is no longer needed since both $b_1$ and $b_2$ are consolidated into b; (2) if $b_1 \in \mathcal{B}$ provides/fetches data to/from $b_2 \in \mathcal{B}$, then let b, instead of $b_1$, provides/fetches this data to/from $b_2$.

To generate a TCP sharing plan for BPMS, the data fetching plan is designed in such a way that, when the current bin is being filled, without knowledge about the bins to the right of the current bin, one can still decide whether the current bin needs to fetch data from another bin, or provide data to other bins, for each sharing s.

To do so, the following data fetching plan is used. Given a placement plan that consists of m bins $b_1, \ldots, b_m$, let $V_i$ denote the set of vertices placed in $b_i$. For each sharing s=(u,U):

If $u \in V_i$, and $U \cap V_i \neq U$, then $b_i$ provides the data of s to either one bin or two bins. Let $b_j$ be the rightmost bin to the left of $b_i$ which contains vertices in U, and let $b_k$ be the leftmost bin to the right of $b_i$ which contains vertices in U. Then $b_i$ provides the data to $b_j$ and $b_k$, if exist (note that at least one of them exists).

If $u \notin V_i$, and $U \cap V_i \neq \emptyset$, then $b_i$ fetches the data of s from another bin $b_j$. Let $b_k$ be the bin that contains u. If k>i, $b_j$ is the leftmost bin to the right of $b_i$ such that either j=k, or $U \cap V_j \neq \emptyset$. Otherwise, $b_j$ is the rightmost bin to the left of $b_i$ such that either j=k, or $U \cap V_j \neq \emptyset$.

If $u \notin V_i$ and $U \cap V_i = \emptyset$, let $b_k$ be the bin that contains u. $b_i$ provides the data of s to exactly one other bin $b_j$ if and only if one of the following two cases happens: (1) k>i, and there exist bins to the left of $b_i$ that contain vertices in U. In this case, $b_j$ is the rightmost bin to the left of $b_i$ that contains vertices in U. (2) k<i, and there exists bins to the right of $b_i$ that contain vertices in U. In this case, $b_j$ is the leftmost bin to the right of $b_i$ that contains vertices in U.

Using this data fetching plan, a bin $b_i$ is being filled, it is still possible to know whether $b_i$ receives or provides the data of a sharing from/to other bins. For example, for a sharing s=(u,U), if u is placed in a bin before $b_i$, then $b_i$ needs to provide the data to another bin if and only if not all remaining vertices in U are placed in $b_i$.

Figure 4:
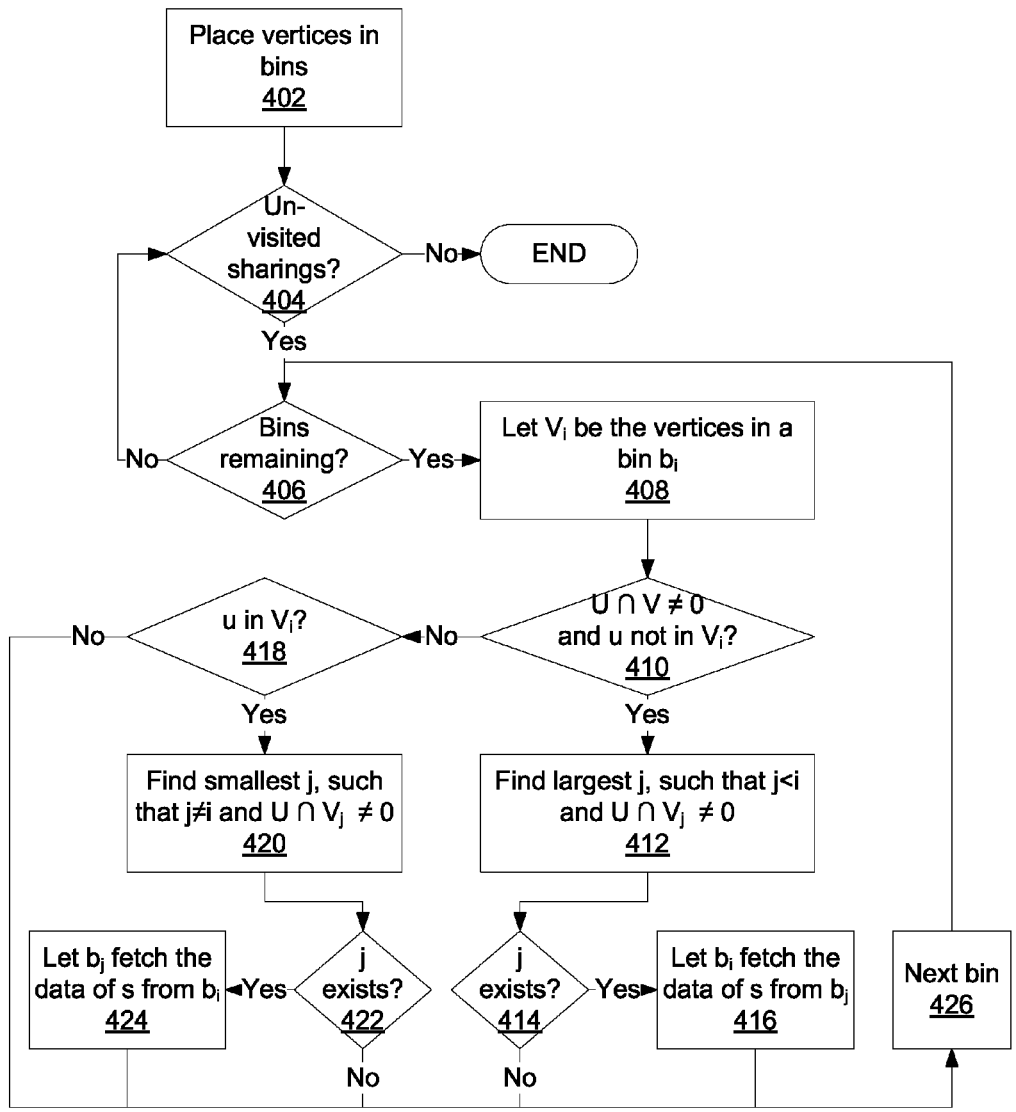
FIG. 4 is a block/flow diagram of tenant placement in a multi-tenant database system with one-to-many sharing according to the present principles.

Referring now to FIG. 4, a method for generating a data fetching plan is shown. Block 402 places vertices in bins using, e.g., the bin placement method described above in FIG. 2. Block 404 determines whether all of the sharings between vertices have been visited. If there are no more unvisted sharings, processing ends. If there are, block 406 determines whether all bins have been checked. If not, processing returns to block 404 for the next sharing. If so, block 408 collects the vertices in a bin b, into set $V_i$. Block 410 determines whether the intersection of U and $V_i$ is an empty set and whether u is not in $V_i$. If both conditions are true, block 412 finds the largest j, such that j<i and the intersection of U and $V_j$ is an empty set. Block 414 determines whether such a j exists. If so, block 416 fetches the sharing data s from bin $b_j$ for bin $b_i$. Processing then proceeds to block 426 and a new bin is selected.

If the condition in block 410 was false, block 418 determines whether u is in $V_i$. If so, block 420 finds the smallest j, such that j is different from i and the intersection of U and $V_j$ is an empty set. If such a j exists at block 422, then block 424 fetches the sharing data s from bin b, for bin Processing then proceeds to block 426 and a next bin is selected.

Processing continues in this manner until all bins have been checked for all sharings. This produces a locally optimum placement for any BPMS instance if the instance occupies a valid sharing plan. Even using a similar assumption to the above, where there is a valid sharing plan such that each vertex is placed in a distinct bin, finding a sharing plan is computationally expensive.

Creating the sharing plan may be understood as spreading sharing relationships out along a line of databases. The databases may be ordered in any way, though it is specifically contemplated that they will be ordered in terms of their time of creation. Rather than having each tenant access shared data from a single provider tenant u, the burden of sharing data is spread out across the databases. The method of FIG. 4 establishes data fetching between nearby databases that have access to the data in question.

Having described preferred embodiments of a system and method for tenant placement in multitenant cloud databases with data sharing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for generating a data fetching plan in a multi-tenant system, comprising:
   placing tenants in consecutively allocated databases using a processor according to a weighted graph of tenants and sharing relationships between tenants, where at least one sharing relationship includes multiple accessing tenants accessing a given set of data from a provider tenant; and
   for each such sharing relationship:
      if a current database has one or more accessing tenants and does not have the provider tenant, fetching data from the latest-allocated database prior to the current database that has accessing tenants, if such a database exists;
      if a current database has the provider tenant, providing data to the earliest-allocated database after the current database that has accessing tenants if such a database exists;
   performing Bin Packing with one-to-Many Sharings (BPMS) with inputs including a set of vertices V, a set of sharings S among the vertices, and a bin capacity B, each vertex $u \in V$ is associated with a non-negative weight $w_V(u)$, each sharing $s \in S$ is defined as s=(u,U) where $u \in V$, $U \subset V$ and $u \notin U$, each sharing s is associated with two non-negative weights: $w_{in}(s)$ and $w_{out}(s)$; and
   repeating said fetching and providing steps for each allocated database.

2. The method of claim 1, wherein each tenant is assigned to one and only one database.

3. The method of claim 2, wherein the weighted graph of tenants and sharing relationships includes a weight for each tenant and for each sharing relationship that represents an associated degree of resource consumption.

4. The method of claim 3, wherein the weight of a sharing relationship between two tenants is zero when tenants are on the same database and non-zero when the two tenants are on different databases.

5. The method of claim 3, wherein the weight of the tenants and of the sharing relationships are directly comparable.

6. The method of claim 3, wherein placing tenants comprises adding one or more tenants to a database based on said weighted graph and a database capacity, such that the combined weight of the added tenants and the sharing relationships belonging to said added tenants are within the data base capacity.

7. The method of claim 1, wherein placing tenants comprises allocating tenants to a new database when a previous database lacks available resources for new tenants.

8. A method for generating a data fetching plan in a multi-tenant system, comprising:
placing tenants in consecutively allocated databases using a processor according to a weighted graph of tenants and sharing relationships between tenants, wherein the weighted graph of tenants and sharing relationships includes a weight for each tenant and for each sharing relationship that represents an associated degree of resource consumption and wherein at least one sharing relationship includes multiple accessing tenants accessing a given set of data from a provider tenant, comprising:
adding one or more tenants to a database based on said weighted graph and a database capacity, such that the combined weight of the added tenants and the sharing relationships belonging to said added tenants are within the database capacity; and
allocating tenants to a new database when a previous database lacks available resources for new tenants; and
for each such sharing relationship:
if a current database has one or more accessing tenants and does not have the provider tenant, fetching data from the latest-allocated database prior to the current database that has accessing tenants, if such a database exists;
if a current database has the provider tenant, providing data to the earliest-allocated database after the current database that has accessing tenants if such a database exists;
performing Bin Packing with one-to-Many Sharings (BPMS) with inputs including a set of vertices V, a set of sharings S among the vertices, and a bin capacity B, each vertex u∈V is associated with a non-negative weight $w_V(u)$, each sharing s∈S is defined as s=(u,U) where u∈V, U⊂V and u∉U, each sharing s is associated with two non-negative weights: $w_{in}(s)$ and $w_{out}(s)$; and
repeating said fetching and providing steps for each allocated database.

9. The method of claim 8, wherein the weight of a sharing relationship between two tenants is zero when tenants are on the same database and non-zero when the two tenants are on different databases.

10. The method of claim 8, wherein each tenant is assigned to one and only one database.

* * * * *